US009508163B2

United States Patent
Yu et al.

(10) Patent No.: US 9,508,163 B2
(45) Date of Patent: Nov. 29, 2016

(54) ACCELERATED ITERATIVE RECONSTRUCTION

(71) Applicants: General Electric Company, Schenectady, NY (US); The Regents of the University of Michigan, Ann Arbor, MI (US); Purdue University, West Lafayette, IN (US)

(72) Inventors: Zhou Yu, Waukesha, WI (US); Bruno Kristiaan Bernard De Man, Clifton Park, NY (US); Jean-Baptiste Thibault, Waukesha, WI (US); Debashish Pal, Waukesha, WI (US); Lin Fu, Niskayuna, NY (US); Charles A. Bouman, West Lafayette, IN (US); Jeffrey Allen Fessler, Ann Arbor, MI (US); Hung Nien, Ann Arbor, MI (US)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 349 days.

(21) Appl. No.: 13/918,517

(22) Filed: Jun. 14, 2013

(65) Prior Publication Data

US 2014/0369580 A1    Dec. 18, 2014

(51) Int. Cl.
*G06K 9/00* (2006.01)
*G06T 11/00* (2006.01)

(52) U.S. Cl.
CPC ........ *G06T 11/006* (2013.01); *G06T 2211/424* (2013.01); *G06T 2211/428* (2013.01)

(58) Field of Classification Search
None
See application file for complete search history.

(56) References Cited

U.S. PATENT DOCUMENTS

| 6,507,633 | B1 * | 1/2003 | Elbakri ............. G06T 11/006 378/4 |
| 7,885,371 | B2 | 2/2011 | Thibault et al. |
| 2012/0155728 | A1 | 6/2012 | Deman et al. |
| 2013/0108128 | A1 | 5/2013 | Yu et al. |

OTHER PUBLICATIONS

Hudson, H. Malcolm, et al., "Accelerated Image Reconstruction Using Ordered Subsets of Projection Data", IEEE Trans. on Medical Imaging, vol. 13, Issue. 4, pp. 601-609, Dec. 1994.
Kamphuis, Chris, et al., "Accelerated Iterative Transmission CT Reconstruction Using an Ordered Subsets Convex Algorithm", IEEE Transactions on Medical Imaging, vol. 17, Issue 6, pp. 1101-1105, Dec. 1998.
Fessler, Jeffrey A., et al., "Conjugate-Gradient Preconditioning Methods for Shift-Variant PET Image Reconstruction", IEEE Trans. on Image Processing, vol. 8, Issue. 5, pp. 688-699, 1999.
Ahn, Sangtae, et al., "Globally Convergent Image Reconstruction for Emission Tomography Using Relaxed Ordered Subsets Algorithms", IEEE Trans. on Medical Imaging, vol. 22, Issue 5, pp. 613-626, 2003.

(Continued)

*Primary Examiner* — Nirav G Patel
(74) *Attorney, Agent, or Firm* — Fletcher Yoder, P.C.

(57) ABSTRACT

A framework for an iterative reconstruction algorithm is described which combines two or more of an ordered subset method, a preconditioner method, and a nested loop method. In one type of implementation a nested loop (NL) structure is employed where the inner loop sub-problems are solved using ordered subset (OS) methods. The inner loop may be solved using OS and a preconditioner method. In other implementations, the inner loop problems are created by augmented Lagrangian methods and then solved using OS method.

12 Claims, 7 Drawing Sheets

(56) References Cited

OTHER PUBLICATIONS

De Man, Bruno, et al., "A Study of Four Minimization Approaches for Iterative Reconstruction in X-ray CT", IEEE Conference Record, Nuclear Science Symposium, vol. 5, pp. 2708-2710, Oct. 23-29, 2005, Location: Fajardo.

Thibault, Jean-Baptiste, et al., "A Three-Dimensional Statistical Approach to Improved Image Quality for Multi-Slice Helical CT", Med. Phys., vol. 34, Issue. 11, pp. 4526-4544, 2007.

Srivastava, Somesh; "Accelerated Statistical Image Reconstruction Algorithms and Simplified Cost Functions for X-Ray Computed Tomography", Doctoral Thesis—The University of Michigan, 2008.

Quan, E., et al., "A Faster Ordered-Subset Convex Algorithm for Iterative Reconstruction in a Rotation-Free Micro-CT System", Physics in medicine and biology, vol. 54, Issue 4, pp. 1061-1072, Feb. 21, 2009.

Fu, Lin; "Residual Correction Algorithm for Statistical Image Reconstruction in Position Emission Tomography", Ph.D. dissertation, The University of California, Davis, 2010.

Ramani, Sathish, et al., •"A Splitting-Based Iterative Algorithm for Accelerated Statistical X-ray CT Reconstruction", IEEE Trans. Med. Imag., vol. 31, Issue. 3, pp. 677-688, Mar. 2012. [Online]. Available: http://dx.doi.org/10.1109/TMI.2011.2175233.

Mehranian, Abolfazl, et al.; "An Ordered-Subsets Proximal Preconditioned Gradient Algorithm for Edge-Preserving PET Image Reconstruction", Med. Phys.,vol. 40, Issue 5, 2013.

Nien, Hung, et al., "Combining Augmented Lagrangian Method with Ordered Subsets for X-ray CT Image Reconstruction", in Proc.Intl. Mtg. on Fully 3D Image Recon. in Rad. and Nuc. Med, 2013, to appear.

Fu, Lin, et al., "A Preliminary Investigation of 3D Preconditioned Conjugate Gradient Reconstruction for Cone-beam CT"; Proceedings of SPIE, Feb. 2012; 8313:127-DOI:10.1117/12.910903.

Fessler, Jeffrey A., etal., "Fully 3D PET Image Reconstruction Using a Fourier Preconditioned Conjugate-Gradient Algorithm", IEEE Conference Record, Nuclear Science Symposium, vol. 3, Nov. 2-9, 1996, pp. 1599-1602, Location: Anaheim, CA.

Chinn, Garry, et al., "A General Class of Preconditioners for Statistical Iterative Reconstruction of Emission Computed Tomography", IEEE Transactions on Medical Imaging, vol. 16, Issue 1, pp. 1-10, Feb. 1997.

\* cited by examiner

ACCELERATED ITERATIVE RECONSTRUCTION

STATEMENT REGARDING FEDERALLY SPONSORED RESEARCH & DEVELOPMENT

This invention was made with Government support under contract number 1-R01-HL-098686 awarded by the National Institutes of Health. The Government has certain rights in the invention.

BACKGROUND

Embodiments of the invention generally relate to imaging, and more particularly to reconstruction of computed tomography data.

In modern medicine, medical professionals routinely conduct patient imaging examinations to assess the internal tissue of a patient in a non-invasive manner. Furthermore, for industrial applications related to security or quality control, screeners may desire to non-invasively assess the contents of a container (e.g., a package or a piece of luggage) or the internal structure of a manufactured part. Accordingly, for medical, security, and industrial applications, X-ray imaging, such as X-ray computed tomography (CT) imaging, may be useful for noninvasively characterizing the internal composition of a subject of interest.

For computed tomography (CT) imaging suitable for such applications, there are generally two types of image reconstruction approaches: analytical reconstruction and iterative reconstruction. Analytical approaches typically encompass direct reconstruction techniques, such as the use of filtered backprojection techniques. While analytical approaches may be computationally efficient, they may undesirable in certain circumstances due to image quality and/or patient dose considerations. Iterative reconstruction approaches, which iteratively compare and update and image based on a simulated or modeled expectation, may provide superior image quality and dose characteristics. However, iterative reconstruction techniques are generally computationally intensive and may be time consuming as well.

BRIEF DESCRIPTION

In one embodiment an image reconstruction method is provided. In accordance with this method, an objective function of an inner loop nested within an outer loop is determined. The inner loop is iteratively processed using ordered subsets until the inner loop is determined to be complete. Iteratively processing the inner loop comprises computing a gradient of a subset objective function of the objective function, and computing an image update. Upon completion of a respective inner loop, an image is updated with the image update and one or more auxiliary variables, if present, are updated. It is determined whether or not the image is converged. If the image is not converged, a next outer loop is proceeded to, a next objective function of a next inner loop is determined, and the next inner loop is iteratively processed. If the image is converged, the image reconstruction method is ended.

In an additional embodiment an image reconstruction method is provided. In accordance with this method, an objective function of an inner loop nested within an outer loop is determined. The inner loop is iteratively processed using ordered subsets until the inner loop is determined to be complete. Iteratively processing the inner loop comprises applying a preconditioner and computing an image update. Upon completion of a respective inner loop, an update direction is computed for the respective outer loop, a step size is computed for the respective outer loop, and an image is updated. It is determined whether or not the image is converged. If the image is not converged, a next outer loop is proceeded to, a next objective function of a next inner loop is determined, and the next inner loop is iteratively processed. If the image is converged, ending the image reconstruction.

In a further embodiment, an image formation system is provided for use in iterative reconstruction. The image formation system comprises a processing component configured to access acquired data (such as a sinogram) from an imaging device and a memory configured to store one or more routines. The one or more routines, when executed by the processor, cause acts to be performed comprising: determining an objective function of an inner loop nested within an outer loop; iteratively processing the inner loop using ordered subsets until the inner loop is determined to be complete, wherein iteratively processing the inner loop comprises: applying a preconditioner and computing an image update; upon completion of a respective inner loop: computing an update direction for the respective outer loop, computing a step size for the respective outer loop, and updating an image; determining if the image is converged: if the image is not converged, proceeding to a next outer loop, determining a next objective function of a next inner loop, and iteratively processing the next inner loop, and if the image is converged, ending the image reconstruction.

In an additional embodiment, one or more non-transitory computer-readable media are provided. The one or more non-transitory computer-readable media encode routines which, when executed, cause acts to be performed comprising: determining an objective function of an inner loop nested within an outer loop; iteratively processing the inner loop using ordered subsets until the inner loop is determined to be complete, wherein iteratively processing the inner loop comprises: applying a preconditioner and computing an image update; upon completion of a respective inner loop: computing an update direction for the respective outer loop, computing a step size for the respective outer loop, and updating an image; determining if the image is converged: if the image is not converged, proceeding to a next outer loop, determining a next objective function of a next inner loop, and iteratively processing the next inner loop, and if the image is converged, ending the image reconstruction.

One specific embodiment, the augmented Lagrangian ordered subsets (AL-OS) method, has an outer loop that is governed by the updates of auxiliary variables and Lagrange multiplier vectors associated with an augmented Lagrangian, and the inner loop is designed to minimize (approximately) a portion of the augmented Lagrangian using an OS method. For example if x denotes the unknown image to be reconstructed and A denotes the system matrix that relates the image to the sinogram data, then the auxiliary variable $u=Ax$ corresponds to a constraint that leads to an augmented Lagrangian.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
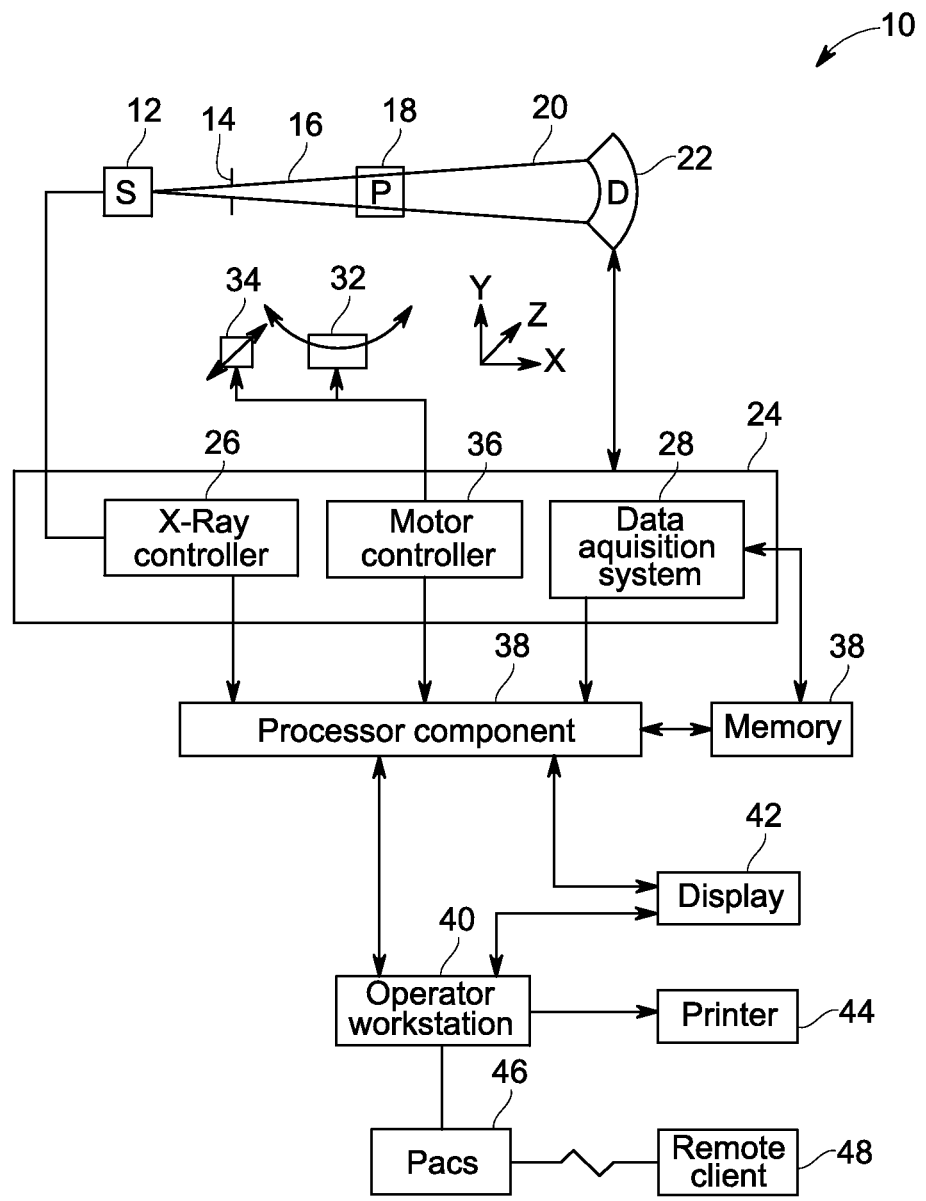
FIG. 1 is a diagrammatical view of a CT imaging system for use in producing images, in accordance with aspects of the present disclosure.

Model-based iterative reconstruction (MBIR) approaches improve various aspects of image quality and have demonstrated potential dose savings. However, these approaches also are associated with long computation time and are computationally intensive, which can preclude adoption of such approaches in clinical environments. The high computation cost of model-based iterative reconstruction (MBIR) is a result of the complexity of various geometrical, physical, and statistical models being employed by MBIR and of the large size of data acquired by conventional multi-slice CT scanners. In particular, MBIR algorithms typically work by first forming an objective function that incorporates an accurate system model, statistical noise model, and prior model. The image is then reconstructed by computing an estimate that minimizes the resulting objective function.

Many types of algorithms can be used for minimizing the objective, or cost, function employed with such MBIR approaches. Sequential algorithms, such as iterative coordinate descent (ICD), have fast convergence rates if given a good initial estimate but require column access to the system matrix and have relatively large computation cost per iteration. Simultaneous algorithms, such as gradient-based methods used with various surrogate functions, perform forward- and back-projection operations over the whole image volume, and thus have a higher level of parallelism. However, in general, due to the ill-conditioned nature of tomographic inversion, standard parallelizable algorithms may converge slowly and may require excessive amount of computation to produce a useful image.

Several approaches have been proposed to accelerate simultaneous algorithms such as the nested loop (NL) method, ordered subset (OS) method, and preconditioner method. In the NL method, the algorithm is composed of inner and outer loop iterations. Each outer loop iteration defines a sub-problem that is then solved by inner loop iterations. The inner loop solution, in turn, is used to compute the update direction of the outer loop. The sub-problems are constructed so that they are relatively easier to solve compared to the original problem. To do this, the sub-problems may be created by approximation to the original problem or using a variable splitting technique.

A second approach, the OS method, accelerates the algorithm by updating images using a sequence of sub-iterations. To do this, the sinogram data is divided into N subsets and each sub-iteration computes the update using only one subset of the data. That is, instead of using the original cost function $f(x)$, the update is computed using a subset cost function:

$$f_k(x) = \frac{1}{2}(A_k x - y_k)^t W_k (A_k x - y_k) + \frac{1}{K}\Phi(x) \quad (1)$$

where $A_k$ is the forward projector from image to the $k^{th}$ subset data, and $y_k$ and $W_k$ denote the subset sinogram and weights respectively. In order to update the image based on $f_k(x)$, one only needs to compute the forward projection and back projection using only a subset of the data. Since forward and back projection steps are the dominant computational cost for one iteration, the computational cost of each sub-iteration is roughly $1/K^{th}$ of the full iteration. Meanwhile, since $f_k(x)$ is a good approximation to $f(x)$ when K is small, each OS sub-iteration sometimes can be as effective as a full iteration without OS. Therefore, by using K subsets, one can potentially speed up the convergence by a factor of K. In practice, the OS method may be fast in low frequency convergence speed, but may need to use a large number of subsets to accelerate high frequency convergence, resulting in large limit cycle and difficulty for parallelization.

A third approach for acceleration is the preconditioner method. A preconditioner is a matrix operator that approximates the inverse of the Hessian matrix of the cost function. By applying a preconditioner, one can speed up the convergence of eigenmodes corresponding to small eigenvalues of the Hessian of the cost function. In a CT reconstruction problem, that typically means accelerating convergence of high frequency components (e.g. sharp edges and noise) in the image. An image space ramp filter may be an effective preconditioner for CT reconstruction problem in two-dimensional (2D) fan beam geometry without statistical weights. The preconditioner design may be extended for use with statistical weights and three-dimensional (3D) geometry. One example of the preconditioner technique is the preconditioned gradient descent method, in which the update direction is given by:

$$u^{(n)} = -M\nabla f(x^{(n)}) \quad (2)$$

where n is the iteration index and M is the preconditioner matrix. The update is then given by:

$$x^{(n+1)} = x^{(n)} + \beta^{(n)} u^{(n)} \quad (3)$$

where $\beta^{(n)}$ is a parameter that controls the step size and is typically computed using a one-dimensional (1D) line search. In practice, the preconditioner approach accelerates convergence of high frequency data, but is less effective in speeding up low frequency convergence.

As will be appreciated from the above discussion, the various approaches employed to accelerate simultaneous algorithms typically have respective weaknesses. For various reasons, addressing the weaknesses of the different approaches is not a straightforward endeavor. For example, simple combination of all or part of these various approaches is not a trivial exercise. In particular, a naive combination would not necessarily result in better performance than the original methods, and might sometimes even lead to divergence.

However, in accordance with the present approach these various weaknesses may be overcome. For example, in certain implementations a framework for a fast parallel MBIR algorithm is employed which combines two or more of an ordered subset method, a preconditioner method, and a nested loop method. For example, in one type of implementation a nested loop (NL) structure is employed where the inner loop sub-problems are solved using ordered subset (OS) methods. In a first implementation, the inner loop problems are the same as the original optimization problem. The inner loop is solved using OS. Further, in one embodiment discussed herein the convergence of OS may be further enhanced by applying a preconditioner to the search direction. One key technical challenge for combining OS and the use of preconditioners is to handle large limit cycles and to prevent the algorithm from diverging. Therefore, as discussed herein, use of a line search method in the outer loop and a mechanism to adapt preconditioner every iteration is proposed to overcome these limitations. In every outer loop, an update direction is computed by combining (e.g., by summing) the update directions from the inner loops and then computing an optimal (or near optimal) step size that minimizes the cost function along the update direction. This line search step helps insure monotonicity of the algorithm. Using OS in the inner loops can boost both low and high frequency convergence compared to previous approaches, such as approaches where preconditioners where employed in the inner loops of a NL algorithm.

In the second discussed implementation, the inner loop problems are created by augmented Lagrangian methods and then solved using OS method. Using OS with an augmented Lagrangian framework may allow new sub-problems to be designed that have not been previously explored, since OS can accommodate non-circulant Hessian matrices. Further, the choice of a non-identity weighting matrix is discussed herein.

With the preceding discussion in mind, an example of a computed tomography (CT) imaging system 10 suitable for use with the present iterative reconstruction approaches is depicted in FIG. 1. Though a CT system 10 is depicted in FIG. 1, it should be appreciated that the system 10 and discussion related to CT imaging is provided merely to facilitate explanation by providing one example of a particular imaging context. However, the present approach is not limited to CT implementations and, indeed may be used in various other imaging contexts, including, but not limited to: magnetic resonance imaging (MRI), positron emission tomography (PET), and single-photon emission computed tomography (SPECT). Indeed, the present approach may be utilized in any context where iterative reconstruction is performed and a cost function is optimized or minimized.

Turning back to FIG. 1, in the depicted example, the CT imaging system 10 is designed to acquire X-ray attenuation data at a variety of views around a patient (or other subject or object of interest) and is suitable for iterative tomographic reconstruction as discussed herein. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated, such as into a fan-shaped or a cone-shaped beam that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing iterative image reconstruction techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for iterative image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing reconstructed images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

With the foregoing discussion of a suitable implementation of a CT imaging system 10 in mind, the following provides background related to iterative image reconstruction approaches that will facilitate the subsequent explanation of the present approaches. The model-based approach may incorporate accurate modeling of system optics of the imaging device, noise statistics in the transmission data, and a priori knowledge of the object being imaged. The model-based approach may improve multiple aspects of image quality, and has demonstrated potential dose savings compared to conventional filtered backprojection (FBP) and other conventional CT reconstruction methods.

Let x denote the image and y denote the measurement data. Both x and y may be considered random vectors, and reconstruction of an image may be accomplished by computing the maximum a posteriori (MAP) estimate given by:

$$x = \arg\min f(x) \quad (4)$$

$$f(x) = J(x,y) + \Phi(x) \quad (5)$$

where $J(x,y)$ is a data mismatch term that penalizes the inconsistency between the image and the measurement and $\Phi(x)$ is a regularization function that penalizes the noise in the image. One example of $J(x,y)$ is in the quadratic form:

$$J(x, y) = \frac{1}{2}\|Ax - y\|_W^2 \quad (6)$$

where A is the forward system matrix and W is a diagonal weighting matrix. The $i^{th}$ diagonal entry of the matrix W, denoted by $w_i$, is inversely proportional to the estimate of the variance in the measurement $y_i$. The data mismatch term in equation (6) is used herein to illustrate the algorithm framework for the present approaches. However, the proposed algorithms can also be applied to other forms of data mismatch terms, such as Poisson log likelihood function.

With this in mind, the first implementation to be discussed is a nested loop (NL), ordered subset (OS)-preconditioner embodiment. In one such embodiment, the OS method is accelerated using a preconditioner and a line search is used at the outer loop so that the cost function reduces monotonically.

In the OS implementation the data is divided into K subsets. Let $\nabla f_k(x)$ denote the sub-gradient computed based on the $k^{th}$ subset. For example, the sub-gradient for the cost function in equations (5) and (6) is given by:

$$\nabla f_k(x) = A_k^t W_k (A_k x - y_k) + \frac{1}{K} \nabla \Phi(x) \quad (7)$$

Conventional simultaneous algorithms typically suffer from slow convergence of high frequencies. Therefore, in one embodiment, a preconditioner is used to accelerate the high frequency convergence. For example, similar to equations (2) and (3), the update direction for the OS-preconditioner for the $k^{th}$ sub-iteration is given by:

$$u^{(n,k)} = -M\nabla f_k(x^{(n)}) \quad (8)$$

where M is the preconditioner matrix. The update is then given by:

$$x^{(n,k+1)} = x^{(n,k)} + \beta^{(n,k)} u^{(n,k)} \quad (9)$$

where $\beta^{(n,k)}$ is the step size of each sub-iteration.

One limitation associated with the OS methodology is that convergence is not guaranteed. Further, when OS is combined with a preconditioner based approach, the limit cycle issue may become more pronounced. To address this issue, in certain embodiments, an outer loop step size optimization is performed. In particular, in certain embodiments a step size β is computed every outer loop iteration to guarantee the monotonicity of the OS-Preconditioner method. This is in contrast to conventional OS approaches where a fixed step size $\beta^{(n,k)} = c$, where c is a predetermined constant. The idea of optimal step size may be based on various approaches, such as those used in gradient based methods. For example, in the steepest descent method, $\beta^{(n)}$ is computed by solving the following optimization problem:

$$\beta^{(n)} = \underset{\beta}{\operatorname{argmin}} f(x^{(n)} + \beta u^{(n)}) \quad (10)$$

The choice of $\beta^{(n)}$ using equation (10) is optimal in the sense that it reduces the cost function the most along the search direction $u^{(n)}$. As a result, it also insures that the cost function decreases in every iteration.

In certain embodiments, the nested loop framework and optimal step size calculation are adapted into the OS-Preconditioner method. In one embodiment, a fixed step size parameter $\beta^{(k)}$ is assumed in all sub-iterations. To apply the step size calculation, a new outer loop step size parameter $\tilde{\beta}^{(n)}$ is introduced. After all sub-iterations are finished, the overall update direction is computed using:

$$u^{(n)} = \sum_k \beta^{(k)} u^{(n,k)} \quad (11)$$

The step size parameter $\tilde{\beta}^{(n)}$ may then be computed using equation (10). The image is updated by:

$$x^{(n+1)} = x^{(n)} + \tilde{\beta}^{(n)} u^{(n)} \quad (12)$$

In another embodiment, the step size can be computed more (or less) frequently. That is, the updates may be summed and the step size computed every P sub-iteration, where P<K (or P>K if computing step size less frequently).

There are several methods that can be used to solve equation (10). In one implementation, the optimization problem can be solved using a 1D line search method. In another example, a quadratic surrogate function to the original problem can be found which results in a closed form solution of β given by:

$$\beta^{(n)} = \frac{(A^t W(Ax - y))^t u + \nabla \Phi(x)^t u}{u^t A^t W A u + u^t Q u} \quad (13)$$

where Q is the Hessian of the quadratic surrogate function to the regularization term.

To solve the 1D optimization problem, the forward projection of u is computed. This calculation is an additional overhead in comparison to conventional OS methods. To reduce the computational cost, projector A may be replaced with an approximation, such as a down-sampled operator, $\tilde{A}D_x$, where $D_x$ is an image down-sampler, and $\tilde{A}$ is a simplified operator that projects the down-sampled image to a down-sampled sinogram space.

With respect to the preconditioner used in the OS portion of this approach, the preconditioner M in equation (8) approximates the inverse of the Hessian matrix of the cost function. In one embodiment, one can use circulant matrix approximation such as $M_1 = \Lambda^{-1} K \Lambda^{-1}$, where Λ is a diagonal matrix and K is an image space filter. In another embodiment, one can use a diagonal matrix $M_2 = D^{-1}$ where $D_{ii}$ is the sum of the $i^{th}$ row of the $A^t WA + Q$ matrix. The circulant matrix approximation provides a more accurate high frequency model of the Hessian, therefore improving the high frequency convergence. Conversely, the diagonal approximation is more accurate for low frequency components of the Hessian. However, since it is a conservative approximation, the convergence speed using $M_2$ is smaller in general.

In a third embodiment, a mixed preconditioner may be used, such as:

$$M = M_1 + \alpha M_2 \quad (14)$$

where α adjusts the relative weights of $M_1$ and $M_2$. In one embodiment, α can be adjusted as a function of iterations to further reduce the limit cycle. In one implementation, α is reduced when the sub-iteration updates start to oscillate. To detect the oscillation, $$T_1^{(n)} = \frac{1}{N} \sum_i \left| \sum_k u_i^{(n,k)} \right| \quad (15)$$

and $$T_2^{(n)} = \frac{1}{N} \sum_i \sum_k |u_i^{(n,k)}| \quad (16)$$

are computed, where i is the pixel index, N is the total number of pixels, and n and k are the iteration and sub-iteration indices respectively. As will be appreciated, $T_2 \geq T_1$ so that when the updates start to oscillate, the ratio $$\frac{T_1}{T_2}$$

tends to decrease. Therefore, α may be updated by:

$$\alpha^{(n+1)} = \alpha^{(n)} \frac{T_1^{(n)}}{T_2^{(n)}} \quad (17)$$

In another embodiment, M can be adapted to each subset of data. Instead of designing M to approximate $(A^T W A)^{-1}$, a sequence of preconditioners $M_k$ can be designed approximating $(A_k^T W_k A_k)^{-1}$.

It should be noted that the implementation of OS discussed herein may be combined or implemented with various acceleration techniques, such as non-uniform (NU)-OS and OS-momentum algorithms. Such OS-based acceleration techniques can be applied to the inner loop OS methods discussed herein.

In another embodiment, a conjugate gradient method may be used in the outer loop. In this approach, the search direction in the outer loop is conjugate with respect to the Hessian of the cost function.

While the preceding discussion relates to various implementations of a nested loop (NL) ordered subset (OS)-preconditioner embodiment, another possible embodiment is an augmented Lagrangian OS embodiment. In accordance with such an embodiment the OS algorithm is accelerated using the augmented Lagrangian (AL) technique, which is useful for solving ill-posed inverse problems using variable splitting. In addition to the classical AL technique for general optimization problems, various extensions and variations may also be employed to further accelerate convergence.

One variation of the AL method is to weight the $l_2$ penalty term in the augmented Lagrangian by some positive definite matrix G. For example, when G is a diagonal matrix with positive diagonal entries, each element of the split variable may be penalized differently, which means the algorithm can take larger steps for those entries that are still far from the solution by increasing the corresponding penalty element. However, such diagonal matrices have seldom been used for other inverse problems because the diagonal weighting matrix can impede the use of fast computation methods, such as FFT and PCG, for the inner problems in the AL method.

In a second implementation, the inner minimization problem of the AL method may be solved with the OS algorithm because OS can accommodate non-circulant Hessian matrices. For example, the simplest penalized weighted least-squares (PWLS) formulation of X-ray CT image reconstruction, i.e.:

$$\hat{x} \in \underset{x \in \Omega}{\operatorname{argmin}}\left\{\frac{1}{2}\|y - Ax\|_W^2 + R(x)\right\} \quad (18)$$

may be employed, where y is the noisy post-logarithm projection, A is the system matrix of a CT scan, W is a diagonal weighting matrix accounting for measurement variance, R is an edge-preserving regularizer, and $\Omega$ is some convex set, such as a box constraint (e.g., non-negativity) on the solution.

In one implementation of the AL approach, instead of solving equation (18) directly, the focus may be on solving the equivalent constrained problem:

$$(\hat{x}, \hat{u}) \in \underset{x \in \Omega, u}{\operatorname{argmin}}\left\{\frac{1}{2}\|y - u\|_W^2 + R(x)\right\} \quad (19)$$

by introducing an auxiliary variable u, where u=Ax.

Equivalently, a saddle point is found of the corresponding augmented Lagrangian of equation (19)

$$\mathcal{L}_A(x, u, d; G) \triangleq \frac{1}{2}\|y - u\|_W^2 + R(x) + \iota_\Omega(x) + \frac{1}{2}\|Ax - u - d\|_G^2 \quad (20)$$

where $\iota_\Omega$ is the characteristic function of set $\Omega$, d is the scaled dual variable of u, and G is a user-selected positive definite matrix, e.g., G=$\eta$I with $\eta$>0, where $\eta$ is the AL penalty parameter. This problem may be solved using the alternating direction method. That is, $\mathcal{L}_A$ may be minimized with respect to x and u alternatively, followed by a gradient ascent of d. The general iterates are:

$$\begin{cases} x^{(j+1)} \in \underset{x \in \Omega}{\operatorname{argmin}}\left\{\frac{1}{2}\|(u^{(j)} + d^{(j)}) - Ax\|_G^2 + R(x)\right\} \\ u^{(j+1)} = (W + G)^{-1}(Wy + G(Ax^{(j+1)} - d^j)) \\ d^{(j+1)} = d^{(j)} - Ax^{(j+1)} + u^{(j+1)} \end{cases} \quad (21)$$

The weighting matrix G cannot be chosen arbitrarily because it becomes the weighting matrix of the quadratic data-fit term for the x-update, and W+G are inverted in the u-update. Nevertheless, there are many viable choices for the matrix G. Any positive definite G will lead to the same final converged image $\hat{x}$. The choice of G affects only the convergence rate.

By way of example, in one embodiment, the focus may be on the preconditioning matrix G=$\eta$W, with $\eta$>0 and the resulting iterates become:

$$\begin{cases} x^{(j+1)} \in \underset{x \in \Omega}{\operatorname{argmin}}\left\{\frac{1}{2}\|(u^{(j)} + d^{(j)}) - Ax\|_W^2 + \eta^{-1}R(x)\right\} \\ u^{(j+1)} = \frac{1}{1 + \eta}(y + \eta(Ax^{(j+1)} - d^j)) \\ d^{(j+1)} = d^{(j)} - Ax^{(j+1)} + u^{(j+1)} \end{cases} \quad (22)$$

Intuitively, this approach more strongly penalizes the more important line integrals, thus leading to larger step sizes for those rays than if one used G=I. Solving the last two equations in equation (22) yields the identity:

$$\eta d^{(j+1)} = y - u^{(j+1)} \quad (23)$$

upon substituting equation (23) into equation (22), the iterates simplify as follows:

$$\begin{cases} x^{(j+1)} \in \underset{x \in \Omega}{\operatorname{argmin}}\left\{\frac{1}{2}\|z^{(j)} - Ax\|_W^2 + \eta^{-1}R(x)\right\} \\ u^{(j+1)} = \frac{1}{1 + \eta}(u^{(j)} + \eta Ax^{(j+1)}) \end{cases} \quad (24)$$

where the following modified sinogram is defined as $z^{(j)} \triangleq \eta^{-1}y + (1 - \eta^{-1})u^{(j)}$. As can be seen from equation (24), the x subproblem is a penalized weighted least-square (PWLS) CT reconstruction problem with a reweighted regularization term and a modified sinogram $z^{(j)}$.

The above AL framework defines the outer loop of one such implementation. Within each outer loop iteration, the inner minimization problem in equation (24) must be solved, exactly or approximately. For one proposed AL-OS approach, an OS algorithm may be used to solve for this inner problem. According to the convergence theorem of ADMM methods, convergence of the outer loop iteration is sufficiently ensured if the errors in solving the inner minimization problems are summable. Thus, to improve the convergence behavior of the AL-OS approach, multiple OS iterations may be run to refine x before updating the split variable u.

Aspects of the AL-OS approach that are worth noting and which are distinct from conventional approaches include, but are not limited to: the use of a non-identity weighting matrix G in the AL formulation and the use of an OS approach to solve the inner minimization problem within the AL framework (as opposed to a preconditioned conjugate gradient).

Figure 3:
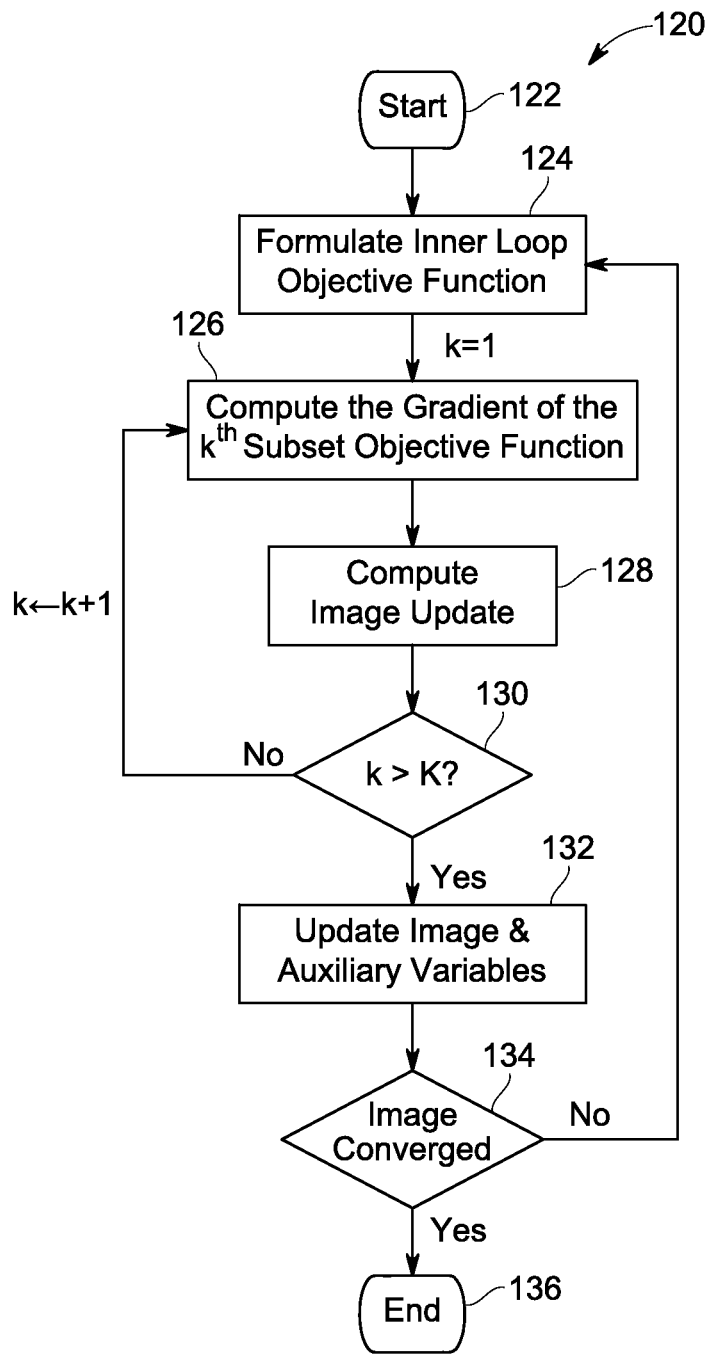
FIG. 3 depicts flow control logic associated with one algorithm for reconstructing an image, in accordance with aspects of the present disclosure.
Figure 4:
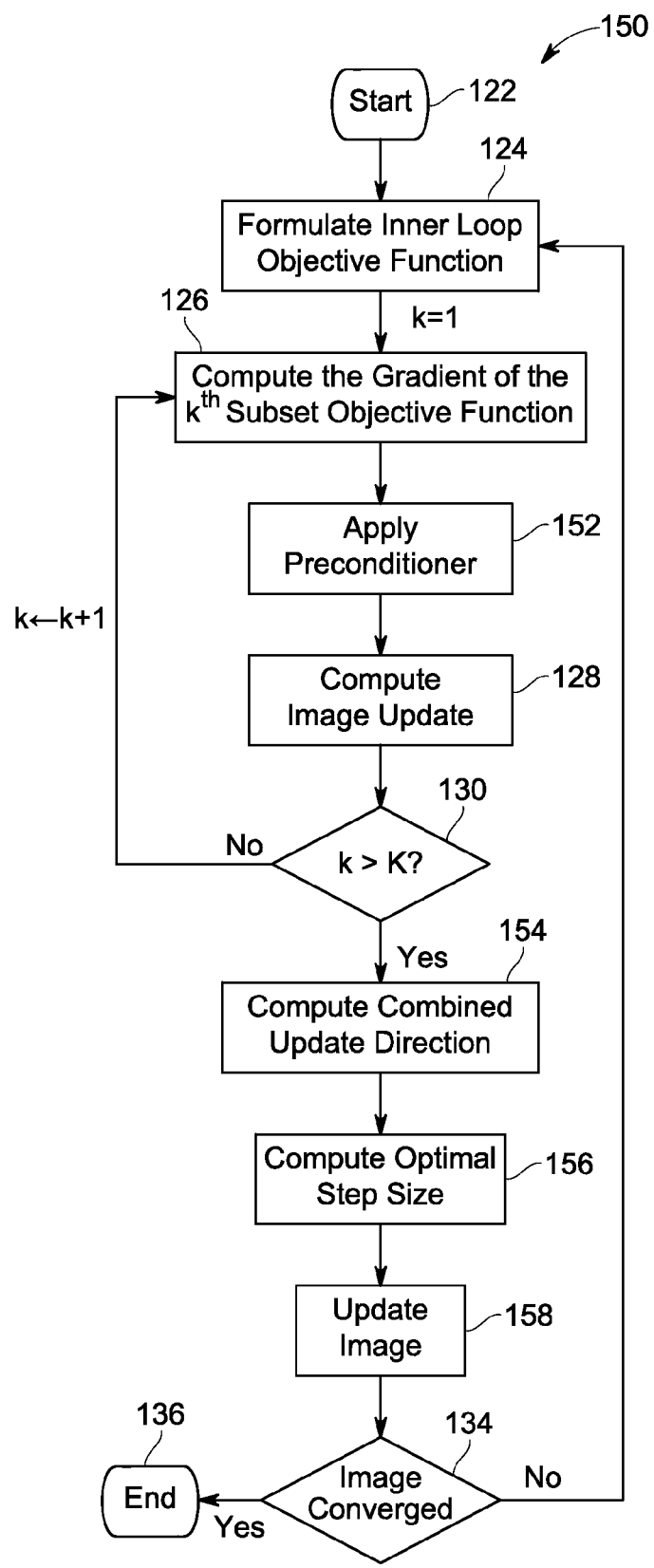
FIG. 4 depicts flow control logic associated with another algorithm for reconstructing an image, in accordance with aspects of the present disclosure.

The preceding described generalized concepts applicable to the present disclosure as well as various specific implementations. With foregoing in mind, and turning to FIG. 2, a block diagram 98 of a generalized implementation is depicted. Similarly, FIGS. 3 and 4 depict flowcharts of specific implementations in accordance with the preceding discussion and comments.

Figure 2:
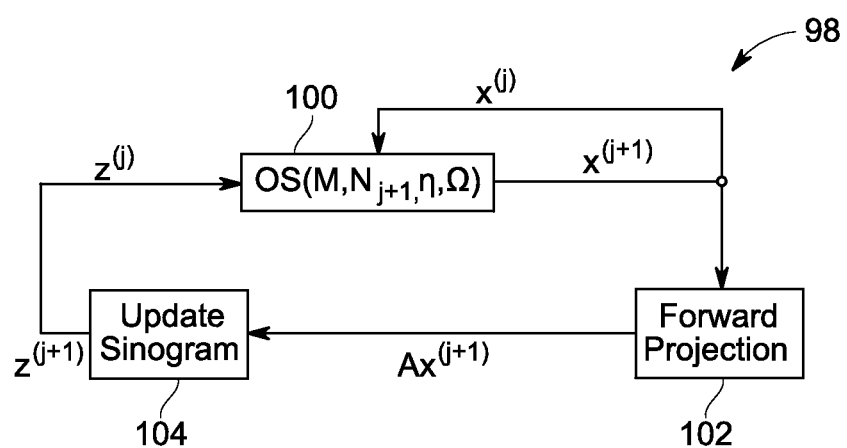
FIG. 2 depicts a high level flow diagram of one implementation of the present approach, in accordance with aspects of the present disclosure.

With respect to FIG. 2. The practical algorithm has the form:

$$\begin{cases} x^{(j+1)} = OS_M^{N_{j+1}}\left(x^{(j)}; \frac{1}{2}\|z^{(j)} - Ax\|_W^2 + \eta^{-1}R(x), \Omega\right) \\ z^{(j+1)} = \frac{1}{1+\eta}(z^{(j)} + (y - Ax^{(j+1)}) + \eta Ax^{(j+1)}) \end{cases} \quad (25)$$

where $OS_M^n(x_0; \psi, C)$ denotes n iterations (M sub-iterations per iteration) of an OS algorithm with initial guess $x_0$, cost function $\psi$, and constraint set C, and where $N_{j+1}$ denotes the number of OS iterations for $x^{(j+1)}$. For example, when $N_{j+1}=P$, the image and sonogram are updated periodically with update period P. This is denoted graphically in FIG. 2, by the respective OS block 100, forward projection block 102 and sonogram update block 104. Furthermore, to minimize the error of the x subproblem (at least for early iterations), the M-time acceleration of the OS algorithm may be leveraged, so the number of subsets should be large enough. However, using too many subsets would lead to a larger limit cycle that will accelerate error accumulation.

Turning to FIG. 4 a more involved flow diagram 120 is provided for a generalized application of presently disclosed embodiments. In FIG. 3, the algorithm initially starts (block 122) and an inner loop objective function is formulated or otherwise defined (block 124), such as per equation (24). The gradient of the $k^{th}$ subset objective function is computed (block 126), such as per equation (7) and an image update is computed (block 128), such as per equation (9).

If k<K (block 130), the current inner loop is incomplete and k is incremented by 1 and the next inner loop is processed, starting at block 126. If k≥K (block 130), the current inner loop is complete and the image and any auxiliary variables are updated (block 132), such as per equations (12) and (25). If the image is determined to be converged (block 134), processing is ended (block 136). Otherwise, the outer loop is incremented and the next inner loop objective function is formulated (block 124).

Similarly, FIG. 4 depicts a variation on this approach employing a preconditioner, as discussed herein. In this example, an algorithm 150 starts (block 122) and an inner loop objective function is formulated or otherwise defined (block 124). The gradient of the $k^{th}$ subset objective function is computed (block 126), such as per equation (7) and a preconditioner is applied (block 152), such as per equations (8) and (14). An image update is computed (block 128), such as per equation (9).

If k<K (block 130), the current inner loop is incomplete and k is incremented by 1 and the next inner loop is processed, starting at block 126. If k≥K (block 130), the current inner loop is complete and a combined update direction is computer (block 154), such as per equation (11). An optimal step size is computed (block 156), such as per equations (10) and (13) and the image is updated (block 158), such as per equation (12). If the image is determined to be converged (block 134), processing is ended (block 136). Otherwise, the outer loop is incremented and the next inner loop objective function is formulated (block 124).

While the preceding discussion relates various embodiments as well as the general approach presently contemplated, the following examples describe results of various implementations of the proposed algorithms. In one study, an algorithm implements a preconditioned-OS (POS) approach, discussed herein, as a straightforward combination of the OS technique with a ramp preconditioner. In this approach, a ramp preconditioner is used to compute the update direction of each subset update, and it is then followed by a line search on the subset cost function $f_k$. Conversely, a second algorithm implements the proposed nested loop ordered subset preconditioner approach (NL-POS). For both POS and NL-POS algorithm, 10 subsets were used per iteration. In this example, the step size in each sub-iteration is fixed to be one, while the optimal step size is calculated every full iteration to guarantee the convergence of the algorithm for unconstrained optimization problems. The sub-iteration is updated using a mixed preconditioner. Additional algorithms included in the study include two simultaneous algorithms: a preconditioned conjugate gradient (PCG) using a ramp preconditioner and an OS accelerated NU-SPS algorithm with 41 subsets.

Figure 5:
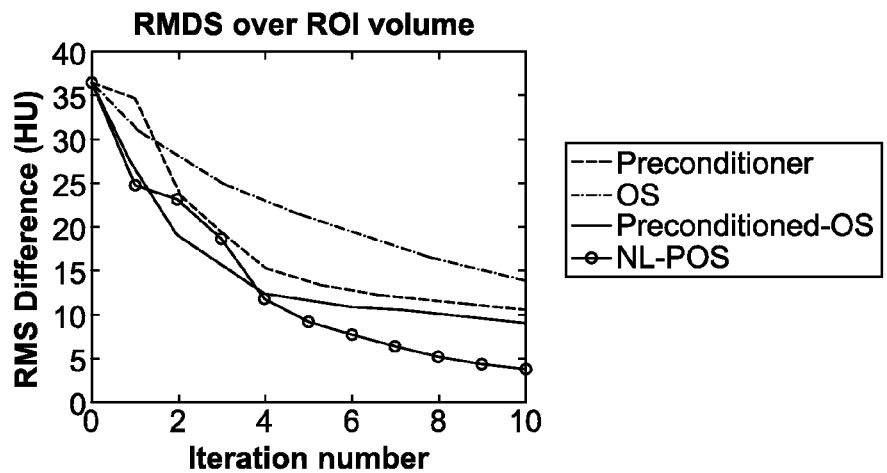
FIG. 5 depicts a plot comparing convergence speed of a proposed algorithm versus other algorithms and looking at the root mean squared difference (RMSD) over a region of interest (ROI) volume, in accordance with aspects of the present disclosure.
Figure 6:
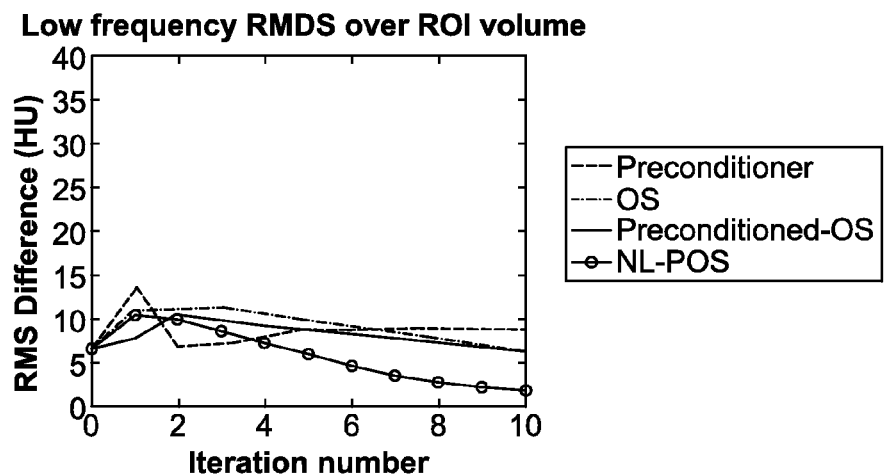
FIG. 6 depicts a plot comparing convergence speed of a proposed algorithm versus other algorithms and looking at the low frequency RMSD over a ROI volume, in accordance with aspects of the present disclosure.
Figure 7:
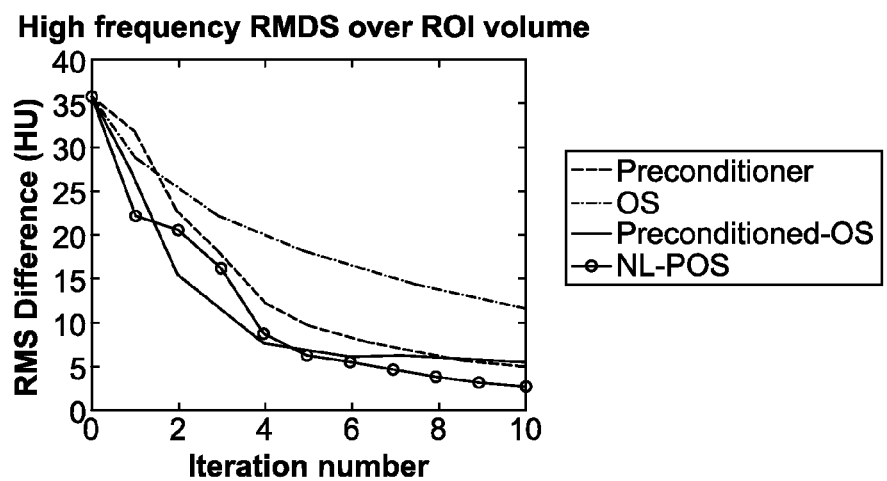
FIG. 7 depicts a plot comparing convergence speed of a proposed algorithm versus other algorithms and looking at the high frequency RMSD over a ROI volume, in accordance with aspects of the present disclosure.

Turning to FIGS. 5-7, these figures show the convergence plots of the above-mentioned algorithms. In particular, the results of one proposed algorithm (i.e., NL-POS) are compared with the remaining algorithms based on a fully converged reference image using NH-ICD algorithm. These figures compare the convergence speed of the NL-POS algorithm (i.e., an implementation of one proposed algorithm) using 10 subsets to certain of the other algorithms noted above (i.e., the ramp preconditioner, OS-SPS) as well as to the naive combination of preconditioner and OS (POS). For each algorithm, the root mean squared difference (RMSD) is measured between the current iteration's image and fully converged ICD image in a region of interest to plot the convergence curve. As shown in the figures, the NL-POS algorithm has the fastest convergence speed among all simultaneous algorithms in the comparison. In particular, the NL-POS algorithm is as fast as OS-SPS in low frequency and faster than both OS-SPS and the ramp preconditioner in high frequency.

In FIG. 5, the overall RMSD convergence plot of all the algorithms is shown. As depicted, a naive combination between the OS and the preconditioner method (i.e., POS) does not yield faster convergence speed. Although it has a fast convergence speed in the beginning, it quickly enters the limit cycle, therefore the convergence curve is flat after the fourth iteration. By comparison, the NL-POS algorithm uses only 10 subsets, and outperforms both conventional algorithms in this interval. The convergence speed of NL-POS is even comparable to sequential methods such as ICD.

To further understand the convergence behavior of all the algorithms, the convergences curves of low frequency components (FIG. 6) and high frequency components (FIG. 7) are also plotted. To compute the low frequency RMSD, a Gaussian low pass filter is applied on the difference image before computing the low frequency RMSD. The high frequency RMSD is computed in a similar fashion. FIGS. 6 and 7 shows that ramp preconditioner method has faster high frequency convergence speed, while OS-SPS is faster in low frequency convergence. The proposed NL-POS algorithm has similar low frequency convergence speed computed to OS-SPS, and the fastest high frequency convergence speed among all algorithms.

In a second study, the proposed algorithm, the AL-OS algorithm, was evaluated using a patient helical CT scan. To investigate the effects of (the AL penalty parameter) and $N_{j+1}=P$ (the update period), three different AL penalty parameters (0.3, 0.5, and 0.7) and three different update periods (1, 5, and 10) were considered in the study. The number of subsets was set to be 41. The standard OS algorithm was considered the baseline method. As will be appreciated, each split variable update requires one extra forward projection compared to the standard OS algorithm. The root mean square (RMS) difference between the reconstructed image and the converged reconstruction was plotted as a function of the number of iterations and the number of forward/back-projection operations (assuming that Ax and A'y have the same computational complexity). Lastly, since the test helical scan contains gain fluctuations, blind gain correction was included in all of the reconstruction algorithms. With this correction, the weighting matrix W and the preconditioning matrix G were diagonal plus a rank-1 matrix rather than pure diagonal, which is a simple extension of the proposed diagonal preconditioned AL method.

With these processing parameters in mind, the initial noisy FBP image, the reconstructed images after about 100 forward/back-projections of the standard OS algorithm and the proposed implementation of an AL-OS algorithm (using different values of $\eta$ and P), and the converged image were compared. Upon review, the shading artifacts due to gain fluctuations were largely suppressed in images generated using the AL-OS algorithm and the proposed AL-OS algorithm, with all configurations, outperformed the standard OS algorithm in image quality, especially for smaller $\eta$ and larger P.

Figure 8:
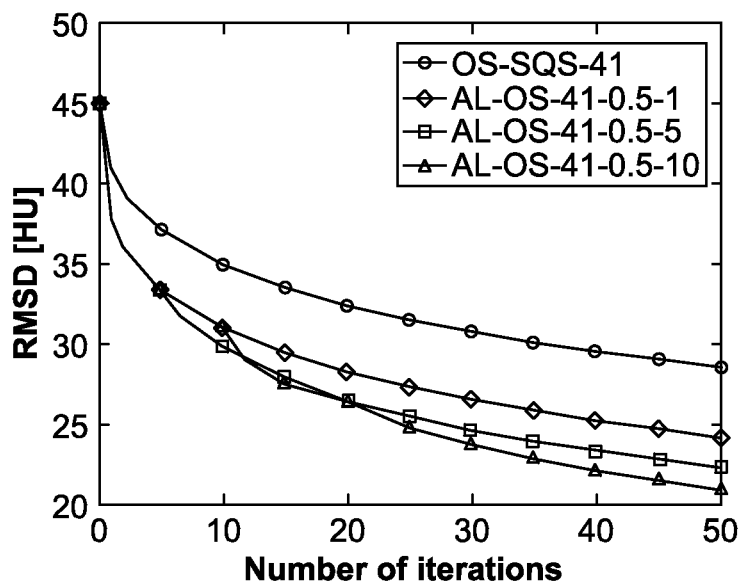
FIG. 8 depicts a plot of RMSD versus iterations for a proposed algorithm and other algorithms, in accordance with aspects of the present disclosure.
Figure 9:
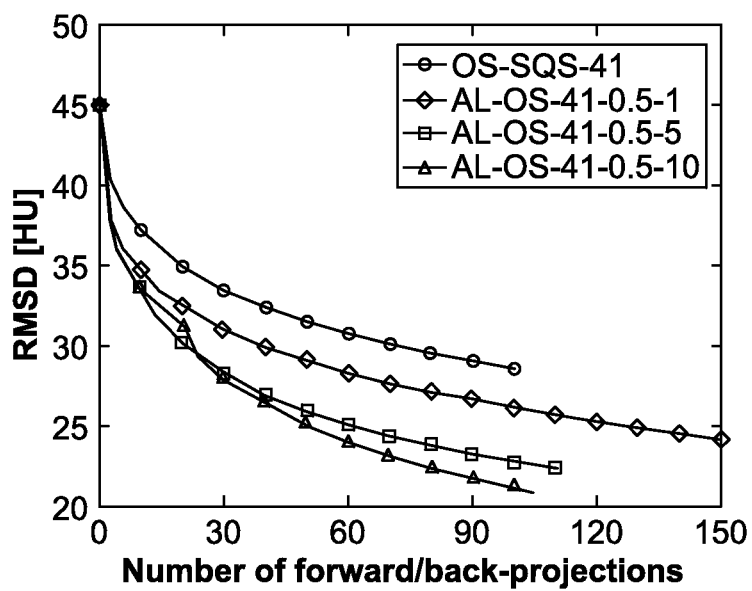
FIG. 9 depicts a plot of RMSD versus the number of forward and back-projection operations for a proposed algorithm and other algorithms, in accordance with aspects of the present disclosure.

FIGS. 8 and 9 show the convergence rate curves of one proposed algorithm with different values of P for the case where $\eta=0.5$, where OS-SQS-M denotes the standard OS algorithm with M subsets, and AL-OS-M-$\eta$-P denotes a proposed AL-OS algorithm with M subsets, the AL penalty parameter $\eta$, and the update period P. In particular, FIGS. 8 and 9 depict RMS differences between the reconstructed image and the converged reconstruction as a function of the number of iterations (FIG. 8) and the number of forward/back-projections with different values of the update period P (FIG. 9). As can be seen in FIGS. 8 and 9, the proposed AL-OS algorithm with update period P=10 converges much faster than the standard OS algorithm. There are sharp drops in the RMS difference when the split variable is updated, especially for larger P and in earlier iterations. This kind of acceleration diminishes as the algorithm proceeds because the speedup of OS algorithm saturates. To have more acceleration, P would need to be increased or M decreased to solve the inner minimization problem more accurately.

Figure 10:
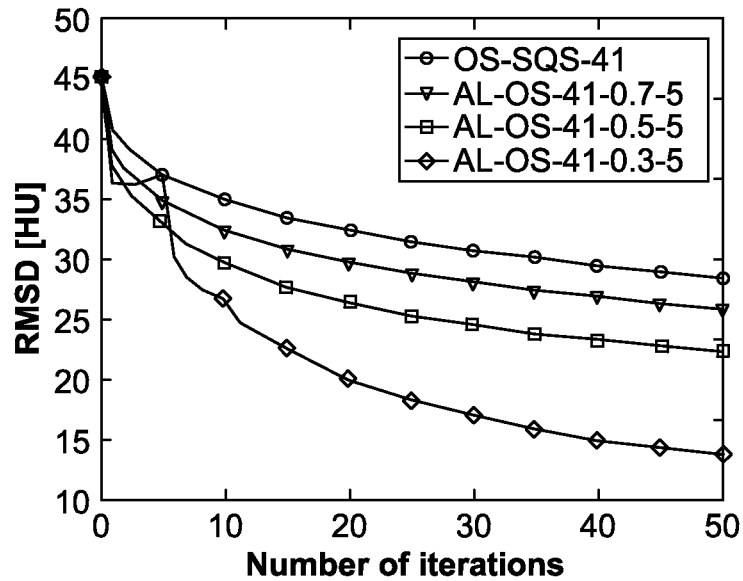
FIG. 10 depicts another plot of RMSD versus iterations for a proposed algorithm and other algorithms, in accordance with aspects of the present disclosure.
Figure 11:
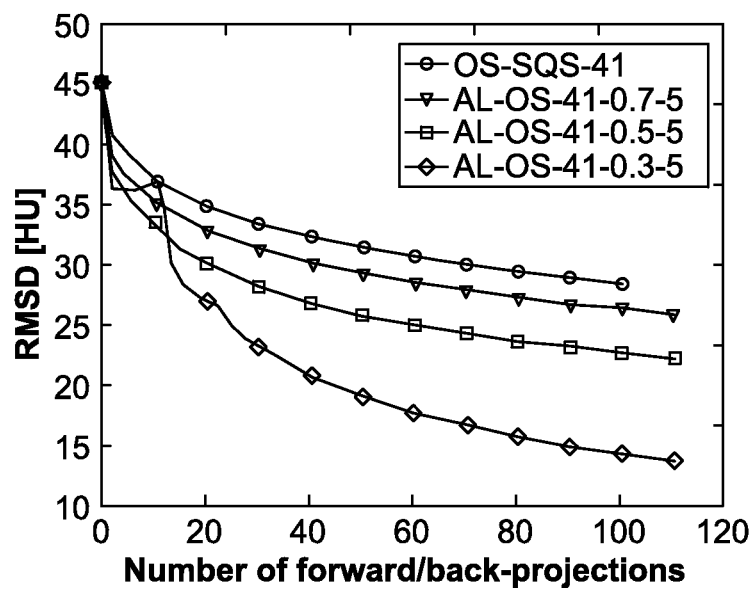
FIG. 11 depicts another plot of RMSD versus the number of forward and back-projection operations for a proposed algorithm and other algorithms, in accordance with aspects of the present disclosure.

FIGS. 10 and 11 show the convergence rate curves of one proposed AL-OS algorithm with different values of $\eta$ for the case P=5, where the naming convention is the same as in FIGS. 8-9. Note that the standard OS algorithm is just a special case of the proposed algorithm when $\eta=1$. In this case, the value of P does not matter because z(j) is independent of u(j). FIGS. 10 and 11, respectively, depict the root mean square (RMS) differences between the reconstructed image and the converged reconstruction as a function of the number of iterations (FIG. 10) and the number of forward/back-projections with different values of the AL penalty parameter $\eta$ (FIG. 11).

As can be seen in FIGS. 10-11, the convergence rate curve converges to the curve of the standard OS algorithm as $\eta$ approaches unity. Smaller $\eta$ shows faster convergence rate because the converged image is smooth and edge-preserved; however, when $\eta$ is too small, for example, when $\eta=0.3$, a sharp increase in RMS difference may be observed which is indicative of over-regularization in early iterations since the inner minimization problem is too different from the original problem. When the inner minimization problem is solved properly, i.e., smaller error due to larger P or M, this misdirection can be corrected by split variable updates, as depicted by the bottom line in both FIGS. 10 and 11. Furthermore, although only the standard OS algorithm is considered here, any fast variation of the OS algorithm, can be applied to the proposed diagonal preconditioned AL method.

Technical effects of the invention include the use of nested loop methodologies with other approaches, including the use of ordered subsets with preconditioners as well as ordered subsets with augmented Lagrangian approaches. The present approaches may be used in iterative reconstruction algorithms.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A processor-implemented image reconstruction method, the method comprising:
   on an imaging system or a remote client in communication with the imaging system, for a given set of scan data acquired by the imaging system determining an objective function of an inner loop nested within an outer loop;
   iteratively processing the inner loop using ordered subsets until the inner loop is determined to be complete, wherein iteratively processing the inner loop comprises:
   applying a preconditioner; and
   computing an image update;
   upon completion of a respective inner loop:
      computing an update direction for the respective outer loop, wherein the update direction is determined by combining a plurality of inner loop update directions from the inner loops encompassed by the respective outer loop;
      computing a step size for the respective outer loop; and
      updating an image;
   determining if the image is converged:
      if the image is not converged, proceeding to a next outer loop, determining a next objective function of a next inner loop, and iteratively processing the next inner loop; and
      if the image is converged, ending the image reconstruction, generating a final image, and displaying a final image on a display of the imaging system or the remote client.

2. The image reconstruction method of claim 1, wherein the step size for each respective outer loop is computed to minimize the objective function associated with the respective outer loop.

3. The image reconstruction method of claim 1, wherein the preconditioner is a combination of two or more other preconditioners.

4. The image reconstruction method of claim 1, wherein gain associated with each component of the preconditioner are adapted each iteration.

5. An image processing system for use in iterative reconstruction, comprising:
a processing component of an imaging system or a remote client in communication with the imaging system, wherein the processing component is configured to access acquired image data from the imaging system; and
a memory configured to store one or more routines which, when executed by the processing component, cause acts to be performed comprising:
for a given set of acquired image data, determining an objective function of an inner loop nested within an outer loop;
iteratively processing the inner loop using ordered subsets until the inner loop is determined to be complete, wherein iteratively processing the inner loop comprises:
applying a preconditioner; and
computing an image update;
upon completion of a respective inner loop:
computing an update direction for the respective outer loop,
wherein the update direction is determined by combining a plurality of inner loop update directions from the inner loops encompassed by the respective outer loop;
computing a step size for the respective outer loop; and
updating an image;
determining if the image is converged:
if the image is not converged, proceeding to a next outer loop, determining a next objective function of a next inner loop, and iteratively processing the next inner loop; and
if the image is converged, ending the image reconstruction, generating a final image, and displaying the final image on a display of the imaging system or the remote client.

6. The image processing system of claim 5, wherein the step size for each respective outer loop is computed to minimize the objective function associated with the respective outer loop.

7. The image processing system of claim 5, wherein the preconditioner is a combination of two or more other preconditioners.

8. The image processing system of claim 5, wherein gains associated with each preconditioner component are adapted each iteration.

9. One or more non-transitory computer-readable media encoding routines which, when executed by a processor of an imaging system or a remote client in communication with the imaging system, cause acts to be performed comprising:
for a given set of scan data acquired by the imaging system, determining an objective function of an inner loop nested within an outer loop;
iteratively processing the inner loop using ordered subsets until the inner loop is determined to be complete, wherein iteratively processing the inner loop comprises:
applying a preconditioner; and
computing an image update;
upon completion of a respective inner loop:
computing an update direction for the respective outer loop wherein the update direction is determined by combining a plurality of inner loop update directions from the inner loops encompassed by the respective outer loop;
computing a step size for the respective outer loop; and
updating an image;
determining if the image is converged;
if the image is not converged, proceeding to a next outer loop, determining a next objective function of a next inner loop, and iteratively processing the next inner loop; and
if the image is converged, ending the image reconstruction, generating a final image, and displaying the final image on the display.

10. The one or more non-transitory computer-readable media of claim 9, wherein the step size for each respective outer loop is computed to minimize the objective function associated with the respective outer loop.

11. The one or more non-transitory computer-readable media of claim 9, wherein the preconditioner is a combination of two or more other preconditioners.

12. The one or more non-transitory computer-readable media of claim 9, wherein gains associated with each preconditioner component are adapted each iteration.

* * * * *